Dec. 6, 1949

J. R. CLAWSON 2,490,029

HOLE CUTTING BROACH

Filed Dec. 3, 1945

Inventor

John R. Clawson

By Clarence A. O'Brien
and Harvey B. Jacobson
Attorneys

Patented Dec. 6, 1949

2,490,029

UNITED STATES PATENT OFFICE 2,490,029

HOLE CUTTING BROACH

John R. Clawson, Pittsburgh, Pa.

Application December 3, 1945, Serial No. 632,393

1 Claim. (Cl. 29—95.1)

The invention as described herein, and illustrated in the accompanying drawings, consists of a broach, an object of which is to provide a cutting tool adapted to cut holes in metal, of many varying sizes and contours.

Another object of the invention is to provide a broach having many cutting edges each of which is staggered in relation to the others thereof.

A further object of this invention is to provide a tool having means for making precision holes.

A primary object of the invention is the provision of means whereby slits, rectangular cuts, tongues polysided, circular holes, may be made with the same.

Other features and advantages will become more readily apparent from the following description and the accompanying illustrative drawings in which.

Figure 1:
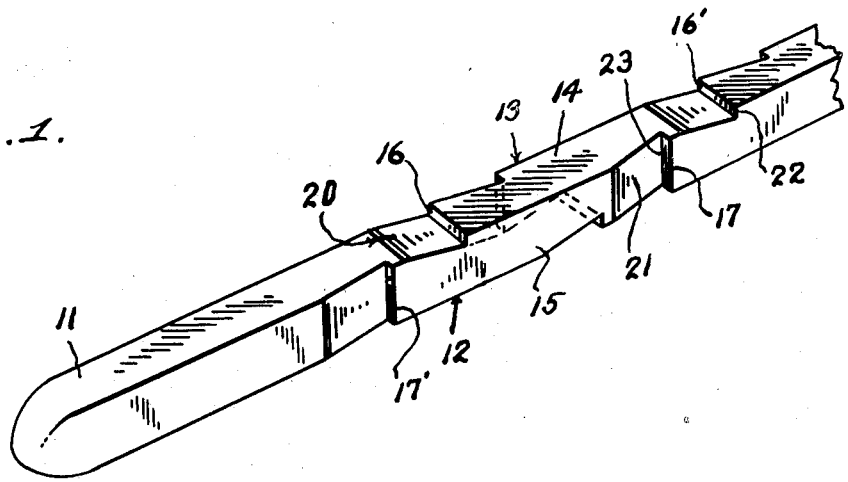
Figure 1 is a perspective view of my broach shown partly broken away.

In the accompanying drawings, and in the following specification, the same reference characters are used to designate the same parts and elements throughout and in which 11 indicates a broach bar substantially rectangular in cross section and each side 12, 13, 14 and 15 of which is provided with a series of transverse cutting edges 16, 17, said transverse edges being formed by the inclines 20, 21, the inclination of which determines the depth 22 and 23, of the cutters 16, 17.

The cutters 16, 17 on all four sides of the device are staggered relative to other cutters, no two of which align vertically with any other cutter whereby there can be no interference of one with the work of another. In Figure 1 of the drawings cutters 16, 16', 17 and 17' indicate the approximate spacing of the cutters on the four sides of the cutter bar 11. The tool is provided with a handle 24, and it may be made any desired length or width and may be used in any type machine or by hand.

Figure 2:
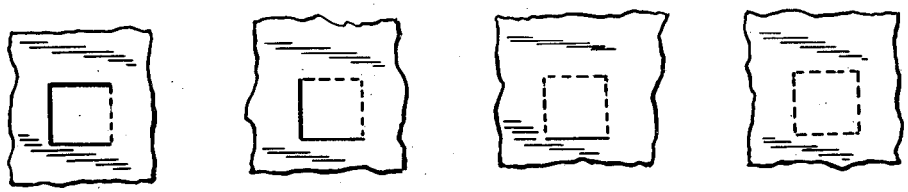
Figure 2 is a diagrammatic view illustrating certain cuts which may be made with the tool.

In Figure 2, I illustrate diagrammatically four of the cuts which may be made with this broach, the dotted lines indicating the cut.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention, that which I claim to be new and desire to procure by Letters Patent is:

A broach comprising a bar generally square in cross-section and having a plurality of transversely disposed integral cutting edges extending the full width of the different sides of the bar and spaced longitudinally of the bar in a regularly consecutively stepped helical arrangement whereby no two cutting edges are in transverse alignment and the bar is not greatly reduced in cross sectional area at any one point, and a depression ahead of each cutting edge to define the front face of said edge, the bottom of said depression constituting an inclined surface extending from said face outwardly and merging with the side of the bar, the cutting edges along any side of said bar being spaced apart longitudinally of the bar by distances greater than the length of said inclined surfaces measured longitudinally of the bar, whereby lands having the full transverse dimensions of the bar are provided adjacent each cutting edge so that said cutting edges may be sharpened without reducing the original bar width of the cutting edges and so that the sides of the bar adjacent each cutting edge comprise guides for the broach.

JOHN R. CLAWSON.

REFERENCES CITED

The following references are of record in the file of this patent:

UNITED STATES PATENTS

| Number | Name | Date |
|---|---|---|
| 62,123 | Elgin | Feb. 19, 1867 |
| 1,448,170 | Utzinger | Mar. 13, 1923 |
| 1,610,870 | McCarty | Dec. 14, 1926 |
| 2,292,440 | Gotberg | Aug. 11, 1942 |